J. GAYNOR.
RESILIENT VEHICLE WHEEL.
APPLICATION FILED JULY 18, 1910.
977,520.
Patented Dec. 6, 1910.
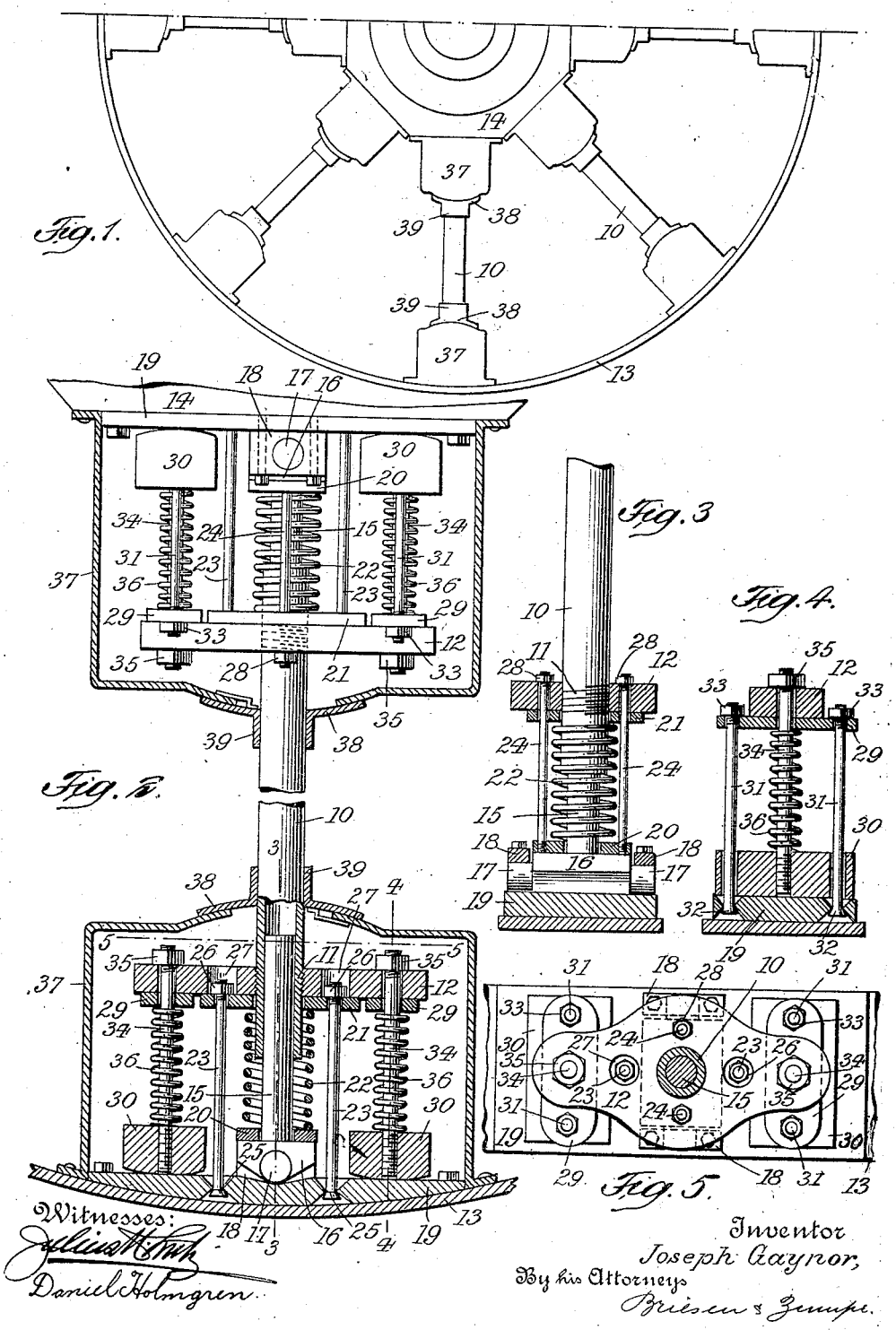
Witnesses:
Inventor
Joseph Gaynor,
By his Attorneys

UNITED STATES PATENT OFFICE.

JOSEPH GAYNOR, OF NEW YORK, N. Y.

RESILIENT VEHICLE-WHEEL.

977,520.  Specification of Letters Patent.  Patented Dec. 6, 1910.

Application filed July 18, 1910. Serial No. 572,436.

*To all whom it may concern:*

Be it known that I, JOSEPH GAYNOR, a citizen of the United States, and a resident of New York city, Brooklyn, county of Kings, State of New York, have invented new and useful Improvements in Resilient Vehicle-Wheels, of which the following is a specification.

This invention relates to a resilient vehicle wheel provided with spring-actuated spokes of novel construction that insure a smooth and easy running, so that pneumatic or similar elastic tires may be dispensed with.

In the accompanying drawing: Figure 1 is an elevation of part of a vehicle wheel embodying my invention; Fig. 2 a longitudinal section through one of the spokes; Fig. 3 a section on line 3—3, Fig. 2; Fig. 4 a section on line 4—4, Fig. 2, and Fig. 5 a section on line 5—5, Fig. 2.

Each spoke is composed of a tubular sleeve 10 having right and left threaded sections 11 which are tapped into an outer and an inner cross head 12. The mechanism intermediate these cross heads and wheel rim 13, as well as hub 14, is substantially identical so that the description of one applies to the other and like reference numerals have been applied to kindred parts. Each end of sleeve 10 is engaged by a plunger 15 having foot 16 which is provided with transverse arbors 17 that turn in bearings 18 of a lining plate 19 bolted to rim 13 and hub 14 respectively. Upon foot 16 is movably fitted an apertured plate 20 that loosely encompasses plunger 15 and is opposed by a plate 21 resting against the corresponding face of cross head 12. A strong spring 22 bearing with its ends against plates 20, 21 respectively encompasses plunger 15 and the exposed end of sleeve 10. Plunger 15 is centered between a pair of longitudinally arranged bolts 23 and a pair of transversely arranged bolts 24. Of these, bolts 23 are swiveled at 25 to lining 19, pass through corresponding apertures of plate 21 and carry nuts 26 that are accommodated by corresponding openings 27 of cross head 12. Bolts 24 are tapped at one end into plate 20, pass through corresponding openings of plate 21 and cross head 12 and carry nuts 28 at their other end. Plate 21 is flanked by a pair of outer plates 29 that face rockers 30 tiltable on lining 19. A pair of transversely arranged bolts 31 are swiveled at one end 32 to lining 19 and pass loosely through rocker 30, which is apertured for the reception of said bolts. The other ends of bolts 31 pass through openings of plates 29 and carry nuts 33. Intermediate bolts 31 there is tapped into rocker 30 a bolt 34 which passes loosely through plate 29, as well as through cross head 12 and carries a nut 35. Bolt 34 is surrounded by a coiled spring 36 bearing with its ends against plate 29 and rocker 30 respectively. Each spoke-end constructed as described, is inclosed within a housing 37 having a slip-joint connection with a cover 38, which is provided with a tubular extension 39 that slidably engages sleeve 10.

During travel, the weight of the carriage body will cause a sagging of the axle. This sagging will effect a telescoping action between the sleeves 10 and plungers 15 of the bottom spokes, so that all six springs 22 and 36 of such spokes will be simultaneously compressed. But the six springs of the top spokes will also be compressed because the sagging of the axle will cause a lengthening of said spokes. By this lengthening, cross heads 12 will recede from their respective lining plates 19, thereby lifting plate 20 and rockers 30 off foot 16 and plates 19 respectively. As plates 21 and 29 cannot participate in this movement owing to bolt connections 23, 31, springs 22, 36 will be compressed in the manner desired. Simultaneously with the described shortening and lengthening of the bottom and top spokes, the lateral spokes will be deflected somewhat out of their normal radial position. This movement of the spokes can take place owing to swivel connections 17, 25, 32 and will likewise cause a compression of springs 36. In this way the springs of the laterally disposed spokes are also utilized to take up the shock, so that practically all springs are constantly in action.

It will be seen that by turning sleeve 10 and manipulating the nuts on the spring-carrying bolts, the tension of the springs may be easily adjusted whenever required.

I claim:

1. A resilient vehicle wheel comprising a rim, a relatively movable hub, a sectional expansible spoke, means for pivoting one spoke member to the rim, a cross head carried by the other spoke member, and a plurality of springs interposed between said cross head and rim.

2. A resilient vehicle wheel comprising a rim, a relatively movable hub, a tripart expansible spoke, the outer members of which are pivoted to the rim and hub respectively, cross heads carried by the inner member, and a plurality of springs interposed between said cross heads and the rim and hub.

3. A resilient vehicle wheel comprising a rim, a relatively movable hub, a sleeve, a pair of cross heads secured to the sleeve, plungers telescoped by the sleeve and fulcrumed to the rim and hub, and springs interposed between the cross heads and the rim and hub respectively.

4. In a resilient vehicle wheel, a lining plate, a footed plunger fulcrumed thereto, a sleeve telescoping the plunger, a cross head secured to the sleeve, a first spring encircling the plunger and interposed between the plunger-foot and cross head, and a pair of second springs flanking the first spring and engaging the cross head.

5. In a resilient vehicle wheel, a lining plate, a footed plunger fulcrumed thereto, a sleeve telescoping the plunger, a cross head secured to the sleeve, a first plate facing the plunger-foot and connected to the cross-head, a second plate facing the cross head and connected to the lining plate, and a spring interposed between said first and second plates.

6. In a resilient vehicle wheel, a lining plate, a footed plunger fulcrumed thereto, a sleeve telescoping the plunger, a cross head secured to the sleeve, a first plate facing the plunger-foot, first bolts that connect said first plate with the cross head, a second plate facing the cross head, second bolts swiveled to the lining plate and connected to said second plate, and a spring interposed between said first and second plates.

7. In a resilient vehicle wheel, a lining plate, a plunger fulcrumed thereto, a sleeve telescoping the plunger, a cross head secured to the sleeve, a pair of rockers flanking the plunger, and springs interposed between the cross head and said rockers.

8. In a resilient vehicle wheel, a lining plate, a footed plunger fulcrumed thereto, a sleeve telescoping the plunger, a cross head secured to the sleeve, a pair of rockers flanking the plunger and connected to the cross head, a pair of plates facing the cross head and connected to the lining plate, and springs interposed between said rockers and second named plates.

9. In a resilient vehicle wheel, a lining plate, a plunger fulcrumed thereto, a sleeve telescoping the plunger, a cross head secured to the sleeve, a pair of perforated rockers flanking the plunger, a pair of plates facing the cross head, first bolts that connect the cross head to the rockers, second bolts that pass through the rocker-perforations and connect the second named plates to the lining plate, and springs interposed between the rockers and said second named plates.

10. In a resilient vehicle wheel, a lining plate, a plunger fulcrumed thereto, a sleeve telescoping the plunger, a cross head secured to the sleeve, a pair of perforated rockers flanking the plunger, a pair of plates facing the cross head, first bolts that connect the cross head to the rockers, second bolts swiveled in the lining plate, passing through the rocker-perforations and connected to said second named plates, and springs interposed between the rockers and the second named plates.

JOSEPH GAYNOR.

Witnesses:
FRANK V. BRIESEN,
KATHERYNE KOCH.